United States Patent [15] 3,690,362
Mago et al. [45] Sept. 12, 1972

[54] HIGH STRENGTH POLYETHYLENE TEREPHTHALATE YARN AND CORD PRODUCED THEREFROM

[72] Inventors: Brij Mohan Mago, Richmond; James Isaac Bruton, Colonial Heights, both of Va.

[73] Assignee: Allied Chemical Corporation, New York, N.Y.

[22] Filed: Sept. 28, 1970

[21] Appl. No.: 76,290

[52] U.S. Cl. ..................152/359, 57/140 R
[51] Int. Cl. ..........D02g 3/48, B60c 9/00, D02g 3/02
[58] Field of Search................57/139, 140, 157, 164; 264/210; 152/359; 161/172

[56] References Cited

UNITED STATES PATENTS

| | | |
|---|---|---|
| 3,553,307 | 1/1971 | Kovac et al. .........57/140 R X |
| 3,216,187 | 11/1965 | Chantry et al. ..........57/140 R |
| 3,448,573 | 6/1969 | Glen et al..................57/140 R |
| 3,413,797 | 12/1968 | Chapman.................57/140 R |
| 3,481,136 | 12/1969 | Timmons et al.............57/164 |
| 3,469,001 | 9/1969 | Keefe...................57/140 R X |
| 3,492,195 | 1/1970 | Spangler et al.......57/140 R X |
| 3,419,060 | 12/1968 | Stansfield.............57/140 R X |

*Primary Examiner*—Donald E. Watkins
*Attorney*—Luther A. Marsh and Roy H. Massengill

[57] ABSTRACT

A product and process for the production of high strength polyethylene terephthalate tire cord by producing an ultra high strength polyethylene terephthalate fiber that is translatable into an improved high strength tire cord by using an improved tensilization process.

7 Claims, No Drawings

HIGH STRENGTH POLYETHYLENE TEREPHTHALATE YARN AND CORD PRODUCED THEREFROM

BACKGROUND OF THE INVENTION

This invention relates to improved polyethylene terephthalate yarn. More particularly, this invention relates to improved polyethylene terephthalate cord made from said yarn and to the process for their production. Still more particularly this invention relates to improved reinforced rubber articles and to improved polyethylene terephthalate yarns and cords for reinforcing such articles.

It is art recognized that prior to incorporating heat stretchable ply-reinforcing materials into end use products, such as tires, industrial belting, etc. that certain physical properties must be obtained and that said physical properties must also be of such a nature that they are substantially retained in the ultimate end use of the materials. Methods for obtaining these physical properties have evolved; however, as greater and greater demands are made on these materials, naturally higher quality materials are being sought to fulfill these demands. Some of the basic physical parameters necessary for improvement in the physical properties of such material, and, particularly with reference to polyethylene terephthalate yarn are breaking strength in pounds, elongation at break in percent, translational efficiency in percent, toughness index and, last, but certainly not least, shrinkage. And although efforts have been made to improve these physical properties, such efforts to date have been ineffective for improving these properties sufficiently for use in areas where exceptionally high strength, high toughness and low shrinkage are required, such as, in heavy duty truck tires, industrial belting, etc. A product and process for preparing such product would indeed make a highly commendable contribution in this technology.

It is, therefore, a prime objective of this invention to provide an improved high strength, high toughness and low shrinkage polyethylene terephthalate textile cord and fabric for reinforcing vulcanized rubber articles. Other objects will appear hereinafter to one skilled in the art.

SUMMARY OF THE INVENTION

The above and other objects of this invention are accomplished by providing improved polyethylene terephthalate yarns and cords in which the intrinsic viscosity of the polymer is at least 0.90 dl. per gram and which have uniform properties of breaking strength in pounds of at least about 69, an elongation at break in percent of at least about 18, a translational efficiency in percent of at least about 87, a toughness index in grams centimeter per denier centimeter of at least about 0.72, and a shrinkage in percent not greater than 5.

Surprisingly, such improved polyethylene terephthalate yarns and cords are provided through a process consisting essentially of heating said yarns and cords under chemically non-reactive conditions to a temperature of about 400° to about 450° F. while maintaining the yarns and cords under tension sufficient to stretch it at least about 4 percent for a period of time of about 40 to 50 seconds, relaxing said yarn at a tension sufficient to relax said yarn such that the total stretch imparted to the yarn is between about 0 and about 8 percent, and thereafter winding up said yarn.

The following definitions will be used throughout the specification and claims.

The term "breaking strength" is defined by ASTM Standards, Part 24, American Society For Testing and Materials 1916 Race Street, Philadelphia, Pa., page 33 (1965) as "the maximum resultant internal force that resists rupture in a tension test," or "breaking load or force, expressed in units of weight required to break or rupture a specimen in a tensile test made according to specified standard procedures."

The term "toughness index" taken from the same ASTM Standards reference book is defined as "the actual work per unit volume or per unit mass of material which is required to rupture the material. It is proportional to the area under the load elongation curve from the origin to the breaking point."

The term "shrinkage" is defined as "percent decrease in length of a material when exposed to elevated temperatures for a specified time."

The term "translational efficiency" is that percent of breaking strength remaining in the yarn after undergoing tensilization.

The term "breaking elongation" is used synonymously and quite often interchangeably with "elongation at break." It is defined as "percent increase in length of a specimen, when extended to its maximum bearable load."

The term "rubber" is intended to be used in its usual and accepted generic sense to include rubber substitutes, compounded rubber, synthetic rubber, etc.

Studies of exceptionally high toughness index polyethylene terephthalate yarns show that by utilizing known processes for tensilizing the yarn, the toughness index, breaking strength, elongation at break, translational efficiency of breaking strength and shrinkage were not translatable into the cord. For example, in the toughness index, it was observed that as the toughness index increases from about 0.6 to about 0.8, the translational efficiency of the breaking strength drops from about 90 percent to about 80 percent when the well known process a 2/2 stretch tensilization was carried out. It is also observed the yarn toughness also decreased for greige cord as well as tensilized cord and further that in all cases the tensilized cord has lower sonic moduli than the sonic moduli of plys from greige cords. It was observed that the sonic modulus for plys removed from greige cord decreases with increasing toughness of the yarn illustrating that the tougher yarns have lower orientation. Therefore, it was surprisingly observed that with the use of high toughness index polyethylene terephthalate yarn, the higher the tensilization tension, the less likely is the possibility of disorientation. These results are readily seen in the following examples and the other varying conditions shown in Table I.

The principles of practicing the invention are further illustrated by the following examples, but without limiting the invention to the details thereof.

EXAMPLE 1

A 1300 denier polyethylene terephthalate yarn is twisted into a 1300/3 cord construction. This is carried out by twisting eight turns per inch in each single strand followed by twisting eight turns per inch in cabling of the three strands in the opposite direction. The polyester yarn is then processed through a Litzler Computreater tensilization unit manufactured by C A. Litzler Co., Inc. of Cleveland, Ohio. While other comparable devices may be employed to treat the cords, the Litzler Computreater was used. The cord is stretched 4 percent with an exposure of 45 seconds at a temperature of 440° F. The stretching is followed immediately by a relaxation of 4 percent in a second oven with an exposure of 55 seconds at a temperature of 420° F. The cord processed in this manner had a breaking strength of 67.2 pounds, elongation at break of 20.7 percent, translational efficiency of 86percent, tensilized cord toughness of 0.75 gram per denier and cord shrinkage was 2.0 percent.

of 16.3 percent, translational efficiency of 86 percent, tensilized cord toughness of 0.65 gram per denier, and cord shrinkage of 5.9 percent.

Polyester tire cords processed under a range of conditions within the scope of this invention are shown in Table I. The cords of 1, 2, 3 and 5 were processed as described in the respective examples. Cords 5 through 13 were processed under conditions as specified in the table. It is illustrated that with utilizing high toughness polyethylene terephthalate yarn, the higher the tensilization tension or stretch in the first zone, followed by a relaxation in a subsequent zone, the high toughness of the yarn is translated into high toughness

TABLE I

| | Polyester tire cord 1300/3 | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| First oven: | | | | | | | | | | | | | | | |
| Temp. (° F.) | 440 | 440 | 440 | 440 | 425 | 525 | 425 | 425 | 460 | 460 | 460 | 460 | 440 | 440 | 440 |
| Time (sec.) | 45 | 45 | 45 | 45 | 45 | 45 | 45 | 45 | 45 | 45 | 45 | 45 | 45 | 45 | 45 |
| Percent stretch | 4 | 6 | 8 | 10 | 4 | 6 | 8 | 10 | 4 | 6 | 8 | 10 | 8 | 8 | 8 |
| Second oven: | | | | | | | | | | | | | | | |
| Temp. (° F.) | 420 | 420 | 420 | 420 | 435 | 435 | 435 | 435 | 440 | 440 | 440 | 440 | 460 | 480 | 490 |
| Time (sec.) | 55 | 55 | 55 | 55 | 55 | 55 | 55 | 55 | 55 | 55 | 55 | 55 | 55 | 55 | 55 |
| Percent relaxation | 4 | 4 | 4 | 4 | 4 | 4 | 4 | 4 | 4 | 4 | 4 | 4 | 4 | 4 | 4 |
| Physical properties: | | | | | | | | | | | | | | | |
| Break strength in lbs | 67.2 | 68.4 | 69.3 | 67.7 | 68.0 | 67.4 | 69.2 | 69.5 | 63.7 | 64.5 | 64.9 | 64.4 | 65.0 | 59.5 | 58.5 |
| Elongation at break (percent) | 20.7 | 20.4 | 18.5 | 16.3 | 20.2 | 19.1 | 16.6 | 16.0 | 20.0 | 18.1 | 15.4 | 15.1 | 16.6 | 15.5 | 15.0 |
| Translational eff. (percent) | 86 | 87 | 88 | 86 | 87 | 86 | 88 | 89 | 81 | 82 | 83 | 82 | 83 | 76 | 76 |
| Toughness (g./d.) | .75 | .78 | .74 | .70 | .77 | .76 | .70 | .70 | .68 | .67 | .61 | .59 | .62 | .53 | .49 |
| Shrinkage in percent | 2.0 | 3.6 | 4.2 | 5.0 | 3.8 | 4.4 | 5.0 | 6.5 | 2.9 | 3.2 | 3.9 | 4.7 | 4.0 | 3.6 | 3.1 |

EXAMPLE 2

A 1300 denier polyethylene terephthalate yarn is prepared as in Example 1, except the initial stretching of the yarn in the Litzler Computreater is 6 percent. The cord processed in this manner had a breaking strength of 68.4 pounds, elongation at break of 20.4 percent, transaltional efficiency of 87 percent, tensilized cord toughness was 0.78 gram per denier and cord shrinkage was 3.6 percent.

EXAMPLE 3

A 1,300 denier polyethylene terephthalate yarn is prepared as in Example 1, except the initial stretching of the yarn in the Litzler Computreater is 8 percent. The cord processed in this manner had a breaking strength of 69.3 pounds, elongation at break of 18.5 percent, translational efficiency of 88 percent, tensilized cord toughness index of 0.74 gram per denier and cord shrinkage of 4.2 percent.

EXAMPLE 4

A 1,000 and 1600 denier polyethylene terephthalate yarn is prepared as Example 1, except the initial stretching of the yarn in the L1tzler Computreator is 8 percent. The physical results respectively for the 1000 denier and the 1600 denier show a breaking strength in pounds 54.1 and 84.5 , elongation at break in percentage of 19.0 and 18.2, translational efficiency in percentage of 88.0 and 87.0, tensilized cord toughness in grams per denier of 0.75 and 0.73 and shrinkage in percentage of 4.0 and 4.4

EXAMPLE 5

A 1300 denier polyethylene terephthalate yarn is prepared as in Example 1, except the initial stretching of the yarn in the Litzler Computreater is 10 percent. The physical results processed in this manner had a breaking strength of 67.7 pounds, elongation at break tensilized cord. The results illustrate the effect of subjecting polyester cord to varying treatments.

The process of the invention can be performed by the use of hot rolls, heated chambers and plates or pins. The apparatus to accomplish the process of the invention is well known and adaptable readily to our process as defined herein. In order to obtain and retain the quality of the yarn of the process, it is necessary to carry out the process in the sequence as outlined herein. Also, as indicated in the examples, the preferred process is conducted as a continuous process with all the operations being carried out in succession on a traveling yarn.

We claim:

1. Polyethylene terephthalate yarn made from polyethylene terephthalate polymer in which the intrinsic viscosity of the polymer is at least 0.90 dl. per gram and which has uniform properties throughout its length upon tensilization of a breaking strength in pounds of at least about 69, an elongation at break in percent of at least about 18, a translational efficiency in percent of at least about 87, a toughness index in grams centimeter per denier centimeter of at least about 0.72, and a shrinkage in percent not greater than about 5.

2. Polyethylene terephthalate yarn according to claim 1 in the form of rubber reinforcements.

3. A polyethylene terephthalate filamentary cord made from polyethylene polymer consisting of two or more yarns twisted together in which the intrinsic viscosity of the polymer is at least 0.90 0.91 dl. per gram and which have uniform properties of breaking strength in pounds of at least about 69, an elongation at break in percent of at least about 18, a translational efficiency in percent of at least about 87, a toughness index in grams centimeter per denier centimeter of at least about 0.72, and a shrinkage in percent not greater than about 5.

4. Polyethylene terephthalate cord according to claim 3 in the form of rubber reinforcements.

5. A vulcanized rubber article reinforced with a polyethylene terephthalate fibrous structure consisting essentially of having an intrinsic viscosity of at least 0.90 dl. per gram and which have uniform properties of breaking strength in pounds of at least about 69, an elongation at break in percent of at least about 18, a translational efficiency of at least about 87, a toughness index in grams centimeter per denier centimeter of at least about 0.72, and a shrinkage in percent not greater than about 5.

6. In a pneumatic tire including a tread member, inextensible beads, and a body member, the improvement which consists essentially of a plurality of plies of tire cord fabric embedded in rubber, said fabric being prepared from yarn of a linear terephthalate polyester having an intrinsic viscosity of at least 0.90 dl. per gram and which have uniform properties of breaking strength in pounds of at least about 69, an elongation at break in percent of at least about 18, a translational efficiency of at least about 87, a toughness index in grams centimeter per denier centimeter of at least about 0.72, and a shrinkage in percent not greater than about 5.

7. An improved industrial yarn characterized by resistance to thermal degradation when embedded in rubber consisting essentially of filaments of a linear terephthalate polyester having an intrinsic viscosity of at least 0.90 dl. per gram and which have uniform properties of breaking strength in pounds of at least about 69, an elongation at break in percent of at least about 18, a translational efficiency of at least about 87, a toughness index in grams centimeter per denier centimeter of at least about 0.72, and a shrinkage in percent not greater than about 5.

* * * * *

PO-1050
(5/69)

UNITED STATES PATENT OFFICE
CERTIFICATE OF CORRECTION

Patent No. __3,690,362__        Dated __September 12, 1972__

Inventor(s) __Brij M. Mago and James I. Bruton__

It is certified that error appears in the above-identified patent and that said Letters Patent are hereby corrected as shown below:

Column 4, Table I, under column 6, first figure "525" should be --425--.

Column 4, Table I, under column 15, line 9, "76" should be --75--.

Column 4, claim 3, line 59, delete "0.91" after "0.90".

Signed and sealed this 15th day of May 1973.

(SEAL)
Attest:

EDWARD M. FLETCHER, JR.
Attesting Officer

ROBERT GOTTSCHALK
Commissioner of Patents